(12) United States Patent
Nishimura et al.

(10) Patent No.: US 11,062,178 B2
(45) Date of Patent: Jul. 13, 2021

(54) IMAGE PROCESSING SYSTEM, METHOD, AND APPARATUS SPECIFYING AN OBJECT INCLUDED IN A CAPTURED IMAGE OUTSIDE A VEHICLE

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 16/506,122

(22) Filed: Jul. 9, 2019

(65) Prior Publication Data
US 2020/0097765 A1    Mar. 26, 2020

(30) Foreign Application Priority Data
Sep. 21, 2018    (JP) .............................. JP2018-177389

(51) Int. Cl.
*G06K 9/00*    (2006.01)
*G06K 9/62*    (2006.01)

(52) U.S. Cl.
CPC ....... *G06K 9/6255* (2013.01); *G06K 9/00805* (2013.01); *G06K 9/6256* (2013.01); *G06K 9/6267* (2013.01)

(58) Field of Classification Search
CPC .. G06K 9/6255; G06K 9/6256; G06K 9/6267; G06K 9/00805; G08G 1/16; G08G 1/166; G08G 1/0104; G06T 1/0007; G06T 7/70
See application file for complete search history.

(56) References Cited

U.S. PATENT DOCUMENTS

| | | | |
|---|---|---|---|
| 10,317,907 B2 * | 6/2019 | Shami | G08G 1/0112 |
| 2017/0193681 A1 * | 7/2017 | Nomoto | G06K 9/2018 |
| 2018/0314259 A1 * | 11/2018 | Shami | B60W 50/14 |
| 2019/0096256 A1 * | 3/2019 | Rowell | G01S 17/58 |

FOREIGN PATENT DOCUMENTS

| | | | | |
|---|---|---|---|---|
| JP | 2004-145660 A | 5/2004 | | |
| JP | 2005/346381 | * 12/2005 | ............. | B60R 21/00 |
| JP | 2005-346381 A | 12/2005 | | |
| JP | 2008-021034 A | 1/2008 | | |

* cited by examiner

*Primary Examiner* — Amara Abdi
(74) *Attorney, Agent, or Firm* — Oliff PLC (57) ABSTRACT

An image processing system includes an image acquisition unit that acquires a captured image obtained by imaging a vehicle outside, a dictionary storage unit that stores dictionary data to be referred to in specifying an object included in the captured image, a specification unit that specifies the object based on the dictionary data, a behavior information acquisition unit that acquires behavior information indicating a behavior state of a vehicle, and a classification unit that classifies, based on the behavior information of the vehicle with respect to an unspecifiable object as the object unspecified by the specification unit, whether or not the vehicle needs to avoid the unspecifiable object. Image data of the unspecifiable object is used for creating the dictionary data along with a classification result of the classification unit.

7 Claims, 6 Drawing Sheets

IMAGE PROCESSING SYSTEM, METHOD, AND APPARATUS SPECIFYING AN OBJECT INCLUDED IN A CAPTURED IMAGE OUTSIDE A VEHICLE

INCORPORATION BY REFERENCE

The disclosure of Japanese Patent Application No. 2018-177389 filed on Sep. 21, 2018 including the specification, drawings and abstract is incorporated herein by reference in its entirety.

BACKGROUND

1. Technical Field

The present disclosure relates to an image processing system, an image processing method, and an image processing apparatus for specifying an object included in a captured image outside a vehicle.

2. Description of Related Art

Japanese Unexamined Patent Application Publication No. 2005-346381 (JP 2005-346381 A) discloses a stereoscopic object recognition device including a stereo camera that images an outside of a vehicle, a distance image creation unit that converts a captured image to a distance image indicating a distance to an object to be imaged, a viewpoint conversion unit that converts the distance image to a plane image, a labeling unit that labels a portion with no data in the plane image, a clustering unit that collates a feature of a labeled group with template data to perform matching, and an image determination unit that specifies a stereoscopic object based on a result of matching.

SUMMARY

In the technique disclosed in JP 2005-346381 A, a captured stereoscopic object is specified through matching with template data; however, all stereoscopic objects to be imaged are hardly stored as template data in advance, and in a case where a stereoscopic object has an indeterminate shape, the stereoscopic object may not be specified with template data. It is desirable that an unspecified type of stereoscopic object can be specified through reimaging.

The disclosure provides a technique for enabling specification of an unspecifiable object included in a captured image in the future.

A first aspect of the disclosure relates to an image processing system. The image processing system includes an image acquisition unit, a dictionary storage unit, a specification unit, a behavior information acquisition unit, and a classification unit. The image acquisition unit is configured to acquire a captured image obtained by imaging a vehicle outside. The dictionary storage unit is configured to store dictionary data to be referred to in specifying an object included in the captured image. The specification unit is configured to specify the object based on the dictionary data. The behavior information acquisition unit is configured to acquire behavior information indicating a behavior state of a vehicle. The classification unit is configured to, based on the behavior information of the vehicle with respect to an unspecifiable object as the object unspecified by the specification unit, classify whether or not the vehicle needs to avoid the unspecifiable object. Image data of the unspecifiable object is used for creating the dictionary data along with a classification result of the classification unit.

In the image processing system according to the first aspect of the disclosure, the classification unit may be configured to classify the image data of the unspecifiable object into a first image group as a group of image data including an object that the vehicle needs to avoid, and a second image group as a group of image data including an object that the vehicle does not need to avoid.

In the image processing system according to the first aspect of the disclosure, the classification unit may be configured to classify images of objects included in the image data classified into the first image group into a plurality of first analogous image groups analogous to one another and classify images of objects included in the image data classified into the second image group into a plurality of second analogous image groups analogous to one another. In the dictionary data, data for specifying a new object generated for each of the first analogous image group and the second analogous image group may be added.

In the image processing system according to the first aspect of the disclosure, the classification unit may be configured to, based on presence or absence of an avoidance operation of the vehicle with respect to the unspecifiable object, classify whether or not the vehicle needs to avoid the unspecifiable object.

In the image processing system according to the first aspect of the disclosure, the image acquisition unit may be configured to acquire the captured images from a plurality of vehicles. The behavior information acquisition unit may be configured to acquire the behavior information from the vehicles. The classification unit may be configured to classify whether or not the vehicle needs to avoid the unspecifiable object according to an avoidance proportion of the vehicles derived based on the behavior information of the vehicles with respect to the unspecifiable object.

The image processing system according to the first aspect of the disclosure may further include a learning unit configured to create new dictionary data based on the classification result of the classification unit.

A second aspect of the disclosure relates to an image processing method. The image processing method includes acquiring a captured image of a vehicle outside, storing dictionary data to be referred to in specifying an object included in the captured image, specifying the object based on the dictionary data, acquiring behavior information indicating a behavior state of a vehicle, based on the behavior information of the vehicle with respect to an unspecifiable object as the object unspecified, classifying whether or not the vehicle needs to avoid the unspecifiable object, and creating dictionary data based on image data of the unspecifiable object and a result of the classification.

A third aspect of the disclosure relates to an image processing apparatus. The image processing apparatus includes an image acquisition unit, a dictionary storage unit, and an information processing apparatus. The image acquisition unit is configured to acquire a captured image obtained by imaging a vehicle outside. The dictionary storage unit is configured to store dictionary data to be referred to in specifying an object included in the captured image. The information processing apparatus is configured to acquire behavior information indicating a behavior state of a vehicle, specify the object based on the captured image and the dictionary data, classify whether or not the vehicle needs to avoid an unspecifiable object unspecified, and create new dictionary data based on a result of the classification.

According to the aspects of the disclosure, it is possible to provide a technique capable of enabling specification of an unspecifiable object included in a captured image in the future.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
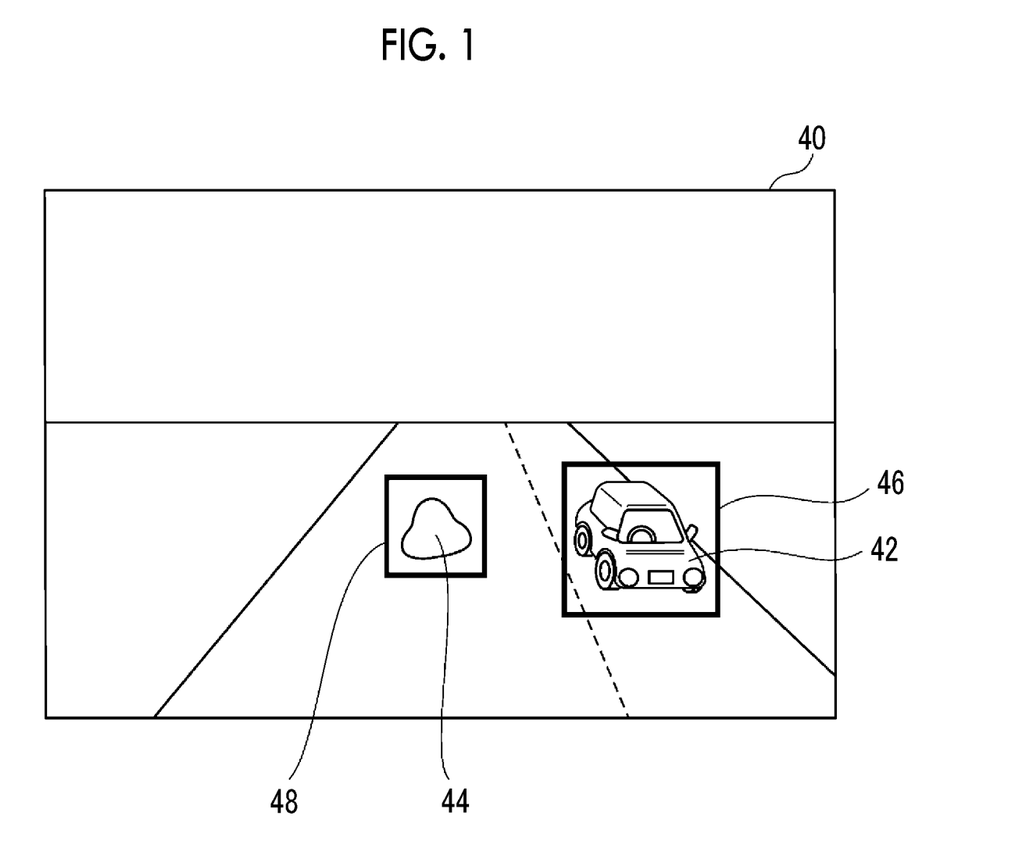
FIG. 1 is a diagram illustrating the outline of an image processing system and is a diagram showing a captured image attached with a first frame and a second frame.

FIG. 1 is a diagram illustrating the outline of an image processing system 1, and shows a captured image 40 attached with a first frame 46 and a second frame 48. The captured image 40 is acquired by imaging a vehicle outside ahead of a vehicle. In the captured image 40, a first object 42 as a vehicle and a second object 44 as a puddle are included. An object is extracted as image data within a certain range in a frame. The object includes a thing formed on a road, such as a depressed hole or a gutter.

In a case where the image processing system 1 specifies that the second object 44 present in a traveling direction of the vehicle becomes an obstacle to traveling, an in-vehicle terminal alerts a driver to avoid the second object 44 or performs control such that the vehicle does not come into contact with the second object 44.

The image processing system 1 determines whether or not each of the first object 42 and the second object 44 corresponds to any object included in dictionary data referring to the dictionary data stored in advance through image processing for recognizing the first object 42 and the second object 44. Here, the image processing system 1 may extract the first object 42 and the second object 44 as an object to be specified and may specify the first object 42 as a vehicle, but may not specify the second object 44. This is because, in a case where a puddle or the like that may be present on a road is indeterminate and has a feature significantly different from a feature of a puddle stored in the dictionary data, the image processing system 1 cannot specify the puddle. An object that is not registered in the dictionary data in advance cannot also be specified by the image processing system 1.

Accordingly, in a case where the unspecifiable second object 44 is present, the image processing system 1 monitors a behavior of the vehicle about whether the vehicle shows a behavior for avoiding the second object 44 or the vehicle shows a behavior for passing through the second object 44 without avoiding the second object 44, classifies whether or not the vehicle needs to avoid the second object 44 based on a detection result of the behavior, and uses image data of the second object 44 for creating the dictionary data. With this, in a case where there is a puddle analogous to the second object 44 subsequently, it is possible to increase a possibility that the image processing system 1 can specify the puddle.

Figure 2:
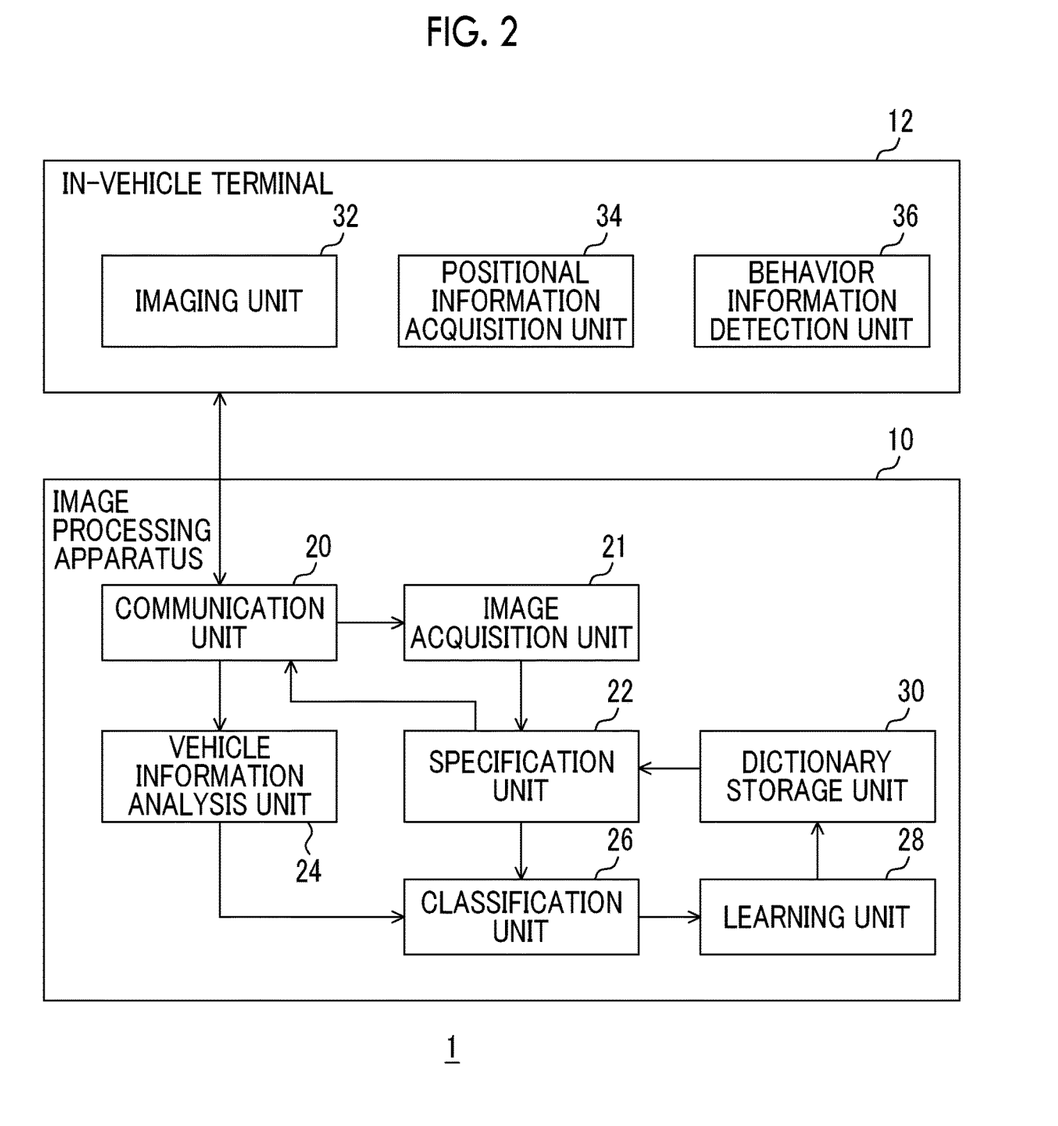
FIG. 2 is a diagram illustrating the functional configuration of the image processing system.

FIG. 2 is a diagram illustrating the functional configuration of the image processing system 1. In FIG. 2, elements described as functional blocks that execute various kinds of processing can be constituted of circuit blocks, memories, and other large scale integrated circuits (LSIs) in terms of hardware and are implemented by a program loaded in a memory and the like. Accordingly, it is understood by those skilled in the art that the functional blocks can be implemented in various forms by hardware alone, by software alone, or by a combination of hardware and software, and are not limited to one of the forms.

An image processing apparatus 10 includes a communication unit 20, an image acquisition unit 21, a specification unit 22, a vehicle information analysis unit 24, a classification unit 26, a learning unit 28, and a dictionary storage unit 30. An in-vehicle terminal 12 includes an imaging unit 32, a positional information acquisition unit 34, and a behavior information detection unit 36.

The imaging unit 32 of the in-vehicle terminal 12 images a vehicle outside to generate a captured image, and transmits the captured image to the communication unit 20 of the image processing apparatus 10. The imaging unit 32 is not limited as imaging the vehicle outside ahead of the vehicle, and may image the vehicle outside behind the vehicle or around the vehicle.

The positional information acquisition unit 34 acquires positional information of the vehicle and the time using a global positioning system (GPS). The positional information acquisition unit 34 acquires the positional information of the vehicle and the time, for example, from a navigation device.

The behavior information detection unit 36 detects behavior information indicating a behavior state of the vehicle and transmits the behavior information to the communication unit 20. The behavior information of the vehicle is information for indicating an avoidance operation of the vehicle, and includes, for example, a steering angle, a vehicle speed, and the time. Furthermore, the behavior information of the vehicle is information indicating a degree of shake when the vehicle passes through an object, and includes an acceleration in a vertical direction and the time. In information indicating the behavior of the vehicle, the captured image may be included or information of other sensors for a vehicle may be included.

The communication unit 20 of the image processing apparatus 10 transmits and receives information to and from the in-vehicle terminal 12 through a network. The communication unit 20 receives the captured image, the positional information, and the behavior information from the in-vehicle terminal 12, and transmits information of an object specified through image processing to the in-vehicle terminal 12. In FIG. 2, although solely one in-vehicle terminal 12 is shown, there is actually a plurality of in-vehicle terminals 12, and the image processing apparatus 10 collects information from the in-vehicle terminals 12.

The image acquisition unit 21 acquires the captured image of the vehicle outside imaged by the imaging unit 32. The dictionary storage unit 30 stores dictionary data to be referred to in specifying an object included in the captured image. The dictionary data is information for specifying an object, such as an automobile, a motorcycle, a person, a garbage bag, or a puddle, and is constituted of a template of the object extracted from image data of the object. The dictionary storage unit 30 stores the template of the object as the dictionary data while attaching, to the template of the object, attribute information indicating whether or not the object is an object that the vehicle needs to avoid. For example, an automobile, a motorcycle, a person, or the like is classified into an object that the vehicle needs to avoid, and a puddle, an umbrella, or the like is classified into an object that the vehicle does not need to avoid. Even objects of the same type may be classified whether or not an object is needed to be avoided according to the size.

The specification unit 22 specifies an object included in the captured image based on the dictionary data. Specifically, the specification unit 22 extracts an object included in the captured image and specifies the object referring to the dictionary data. In a case where a degree of coincidence between an object included in the image data and any template included in the dictionary data is equal to or greater than a predetermined value, the specification unit 22 specifies that the object coincides with the template of the dictionary data, and in a case where the specified object overlaps the traveling direction of the vehicle, the specification unit 22 specifies whether or not the vehicle needs to avoid the object. A specification result of the specification unit 22 is transmitted to the in-vehicle terminal 12 through the communication unit 20. The dictionary data is not limited to solely the template, and may be a rule for classifying an image with a classifier or a parameter.

In a case where determination is made that an object included in the image data does not coincide with any template included in the dictionary data by a predetermined value or more, the specification unit 22 determines that the object is unspecifiable, and transmits image data of the unspecifiable object to the classification unit 26. The image data of the unspecifiable object is, for example, an extracted image in the second frame 48 shown in FIG. 1.

The vehicle information analysis unit 24 acquires the behavior information of the vehicle detected by the behavior information detection unit 36, and detects the presence or absence of an avoidance operation of the vehicle with respect to the object based on the acquired behavior information. The vehicle information analysis unit 24 also functions as a behavior information acquisition unit that acquires the behavior information of the vehicle.

Figure 3A:
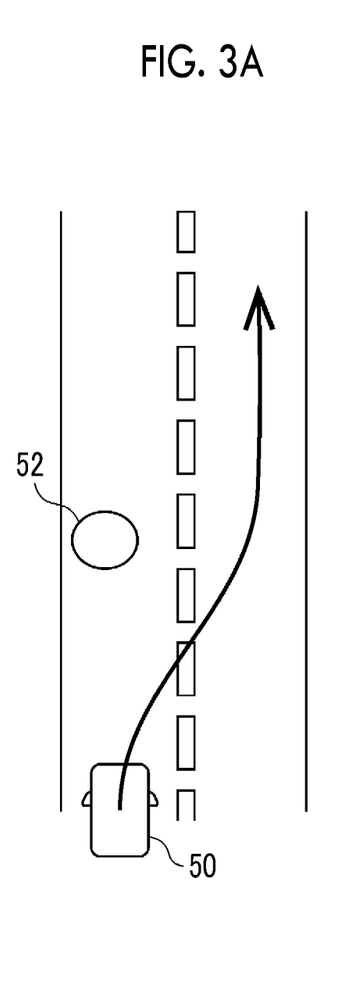
FIG. 3A is a diagram illustrating an avoidance operation of a vehicle.
Figure 3B:
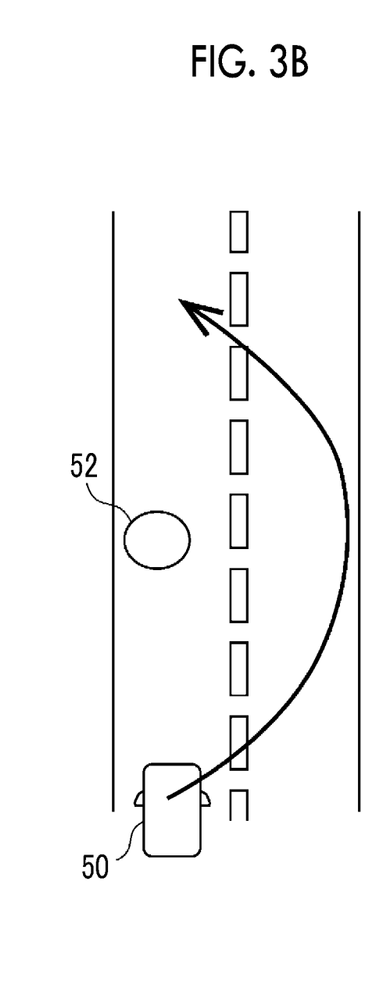
FIG. 3B is a diagram illustrating an avoidance operation of the vehicle.
Figure 3C:
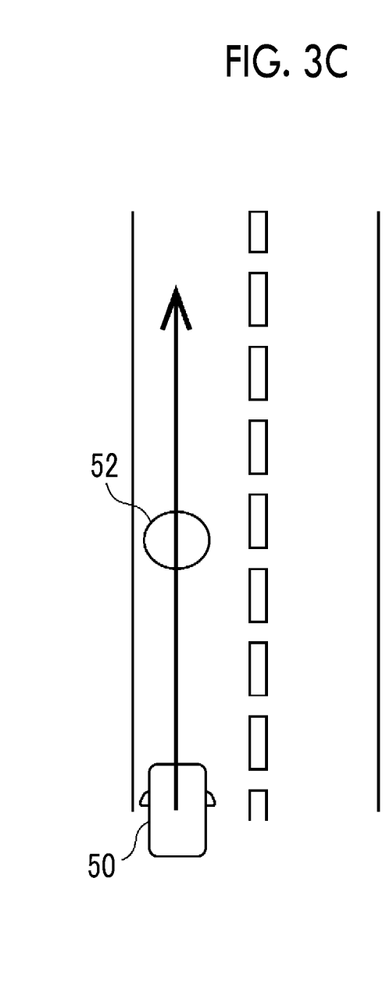
FIG. 3C is a diagram illustrating an avoidance operation of the vehicle.

FIGS. 3A to 3C are diagrams illustrating an avoidance operation of the vehicle. In FIGS. 3A to 3C, a moving trajectory of a vehicle 50 that is traveling on a left lane of a two-lane road is shown, and an object 52 is present at a position overlapping a traveling direction of the vehicle 50. FIGS. 3A and 3B show a case where the vehicle 50 performs an avoidance operation with respect to the object 52, and FIG. 3C shows a case where the vehicle 50 does not perform an avoidance operation with respect to the object 52.

In FIG. 3A, the vehicle 50 performs lane change in order to avoid the object 52, and in a case where detection is made that the vehicle turns based on the behavior information of the steering angle and the vehicle speed immediately after the object 52 is extracted, the vehicle information analysis unit 24 detects the presence of an avoidance operation of the vehicle with respect to the object 52. Association of the presence or absence of the avoidance operation and the object 52 is performed based on an imaging time of the captured image, a detection time of the behavior information, and an acquisition time of the positional information.

In FIG. 3B, the vehicle 50 performs lane change in order to avoid the object 52, and then, performs lane change in order to return to an original lane, and in a case where detection is made that the vehicle turns based on the behavior information of the steering angle and the vehicle speed immediately after the object 52 is extracted, the vehicle information analysis unit 24 detects the presence of an avoidance operation of the vehicle with respect to the object 52.

In FIG. 3C, the vehicle 50 moves straight without avoiding the object 52, and in a case where detection is made that the vehicle does not turn based on the behavior information of the steering angle and the vehicle speed immediately after the object 52 is extracted, the vehicle information analysis unit 24 detects the absence of an avoidance operation of the vehicle with respect to the object 52. The vehicle information analysis unit 24 detects whether or not a strong shake occurs in the vehicle based on the behavior information of the vehicle 50 in a case where the vehicle 50 passes through the object 52.

Returning to FIG. 2, the classification unit 26 classifies, based on behavior information with respect to an unspecifiable object as the object unspecified by the specification unit 22, whether or not the vehicle needs to avoid the unspecifiable object. The classification unit 26 receives a behavior of the vehicle with respect to the unspecifiable object from the vehicle information analysis unit 24 and classifies whether or not the vehicle needs to avoid the unspecifiable object based on the behavior of the vehicle.

The classification unit 26 classifies whether or not the vehicle needs to avoid unspecifiable object based on the presence or absence of avoidance of the vehicle with respect to the unspecifiable object. For example, in a case where the vehicle has avoided the unspecifiable object, there is a high possibility that the unspecifiable object is an object to be avoided, and in a case where the vehicle has not avoided the unspecifiable object, there is a high possibility that the unspecifiable object is an object not needed to be avoided. In this way, even though an object is unspecifiable, it is possible to attach attribute information about whether or not the object is needed to be avoided based on the behavior of the vehicle, and to use the attribute information for the dictionary data for determining whether or not the object is needed to be avoided.

In a case where the vehicle has not avoided an object, the classification unit 26 classifies whether or not the vehicle needs to avoid the object based on the degree of shake of the vehicle. Here, description will be provided referring to FIGS. 4A and 4B.

Figure 4A:
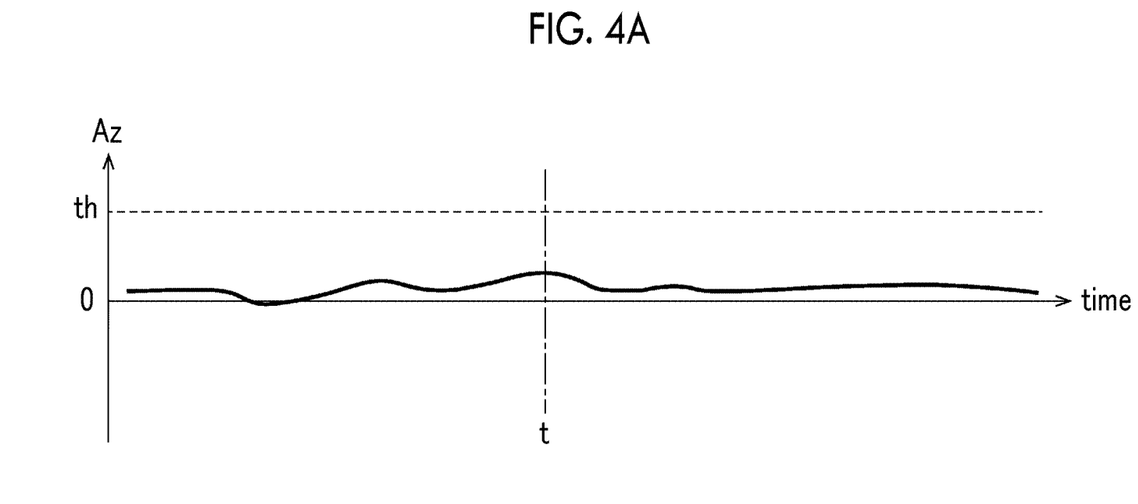
FIG. 4A is a diagram showing a degree of shake of the vehicle at the time of passing through an object.
Figure 4B:
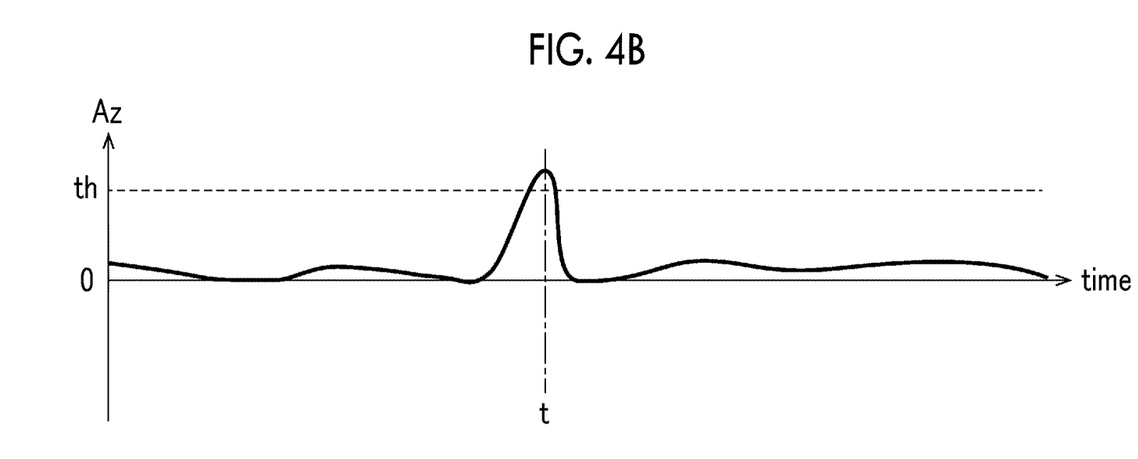
FIG. 4B is a diagram showing a degree of shake of the vehicle at the time of passing through an object.

FIGS. 4A and 4B are diagrams showing the degree of shake of the vehicle at the time of passing through an object. In FIGS. 4A and 4B, the vertical axis indicates an acceleration in a vertical direction, and the horizontal axis indicates time. In FIGS. 4A and 4B, at time t, the vehicle 50 shown in FIG. 3C passes through the object 52.

In FIG. 4A, at time t when the vehicle 50 passes through the object 52, since the vehicle 50 is not shaken much, and the acceleration in the vertical direction is less than a predetermined threshold th, the classification unit 26 classifies that the vehicle 50 does not need to avoid the object 52.

In FIG. 4B, at time t when the vehicle 50 passes through the object 52, the vehicle 50 is shaken much, and the acceleration in the vertical direction is equal to or greater than the predetermined threshold th, the classification unit 26 classifies that the vehicle 50 needs to avoid the object 52.

In this way, even in a case where the vehicle 50 has not avoided the object 52, in a case where the degree of shake of the vehicle 50 is equal to or greater than the predetermined threshold th, the classification unit 26 can classify that the object 52 is needed to be avoided, and the accuracy of classification about whether or not an object is needed to be avoided can be increased.

Returning to FIG. 2, the classification unit 26 acquires the presence or absence of avoidance operations of a plurality of vehicles with respect to the same unspecifiable object, and classifies whether or not the vehicle needs to avoid the unspecifiable object based on an avoidance proportion of the vehicles with respect to the unspecifiable object. For example, even in a case where the vehicle has avoided an unspecifiable object, there is a possibility that many other vehicles that travel on the same road do not avoid the object. In this way, classification is performed based on the behavior information of the vehicles with respect to the unspecifiable object, whereby it is possible to increase the accuracy of classification about whether or not the unspecifiable object is needed to be avoided. In a case where a proportion that the vehicle avoids an object is equal to or greater than 50 percent, the classification unit 26 classifies the object into an object needed to be avoided, and in a case where a proportion that the vehicle avoids an object is less than 50 percent, the classification unit 26 classifies the object into an object not needed to be avoided.

The classification unit 26 may classify whether or not the vehicle needs to avoid an unspecifiable object based on the avoidance proportion of the vehicles with respect to the unspecifiable object and the degree of shake of the vehicles at the time of passing through the unspecifiable object.

The classification unit 26 classifies image data of a plurality of unspecifiable objects based on whether or not an object is needed to be avoided, and then, further classifies the image data of the unspecifiable objects into analogous image groups analogous to one another using a known method. That is, the classification unit 26 groups the image data of the unspecifiable objects into analogous things. A classification result will be described referring to FIG. 5.

Figure 5:
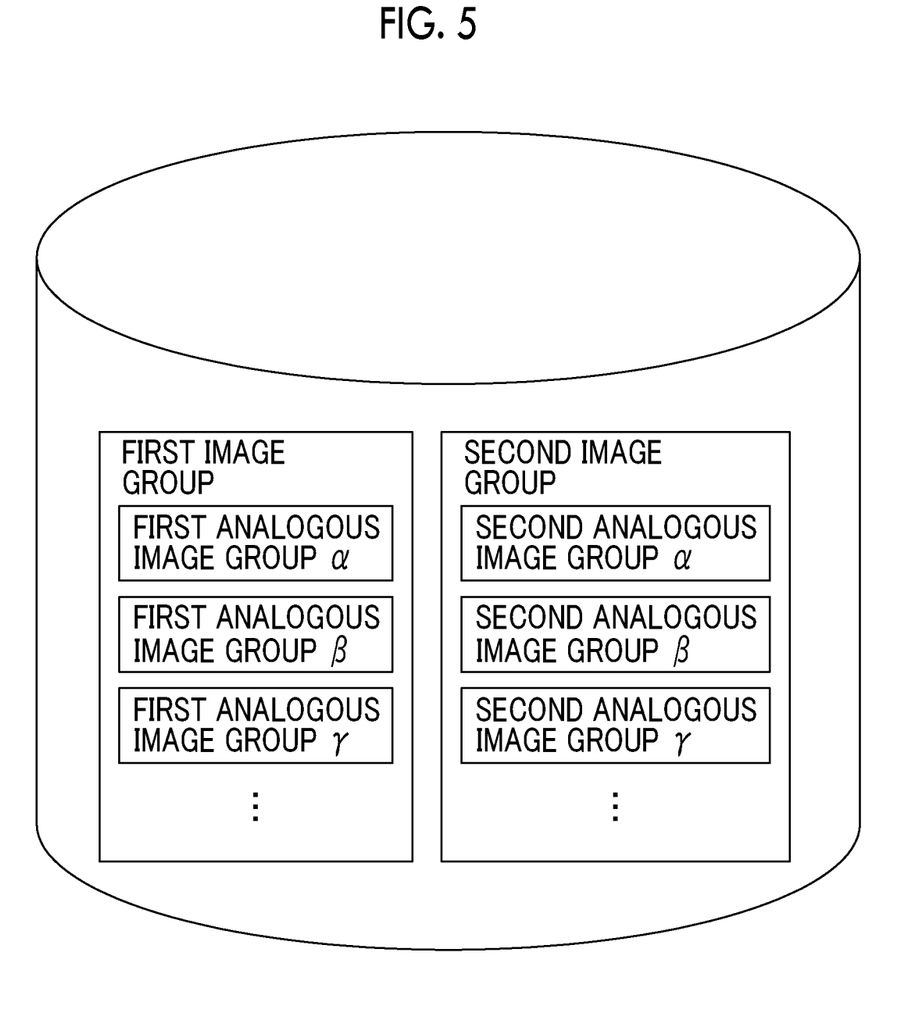
FIG. 5 is a diagram illustrating a classification result of an unspecifiable object in a classification unit.

FIG. 5 is a diagram illustrating a classification result of unspecifiable objects in the classification unit 26. The classification unit 26 classifies image data of the unspecifiable objects into a first image group as a group of image data including an object that the vehicle needs to avoid, and a second image group as a group of image data including an object that the vehicle does not need to avoid. For example, although a puddle and a depressed hole are analogous in shape, the puddle is not needed to be avoided, but the depressed hole is needed to be avoided. With classification into the first image group and the second image group, it is possible to distinguish between analogous shapes, such as a puddle and a depressed hole, based on the vehicle behavior.

The classification unit 26 classifies images of objects included in the image data classified into the first image group into a plurality of first analogous image groups analogous to one another, and classifies images of objects included in the image data classified into the second image group into a plurality of second analogous image groups analogous to one another. The image data included in the analogous image groups has analogy equal to or greater than a predetermined score. With this, it becomes easy to capture a feature of image data of an unspecifiable object, and it is possible to improve a recognition rate of the specification unit 22 when the dictionary data is used.

The classification unit 26 may acquire an image analogous to the analogous image group through the network and may attach a label name attached to the analogous image to the analogous image group.

Returning to FIG. 2, the learning unit 28 performs learning based on the analogous image groups of the unspecifiable objects classified by the classification unit 26, and transmits a learning result as a new type of dictionary data to the dictionary storage unit 30. In a case where the number of pieces of image data of the objects included in the analogous image groups of the unspecifiable objects is equal to or greater than a predetermined number, the learning unit 28 calculates feature quantities from the analogous image groups and learns the feature quantities to calculate data for specifying a new object. In this way, the image data of the unspecifiable object as the object unspecified by the specification unit 22 is used for creating the dictionary data along with the classification result of the classification unit 26.

In the dictionary data, data for specifying a new object generated for each of the first analogous image group and the second analogous image group is added. In this way, it is possible to create dictionary data for specifying an object analogous to an unspecifiable object based on image data of the unspecifiable object. With this, even though an object analogous to an object unspecified in the past is imaged, the object is not unspecifiable, and the specification unit 22 can specify whether or not the object is needed to be avoided.

Figure 6:
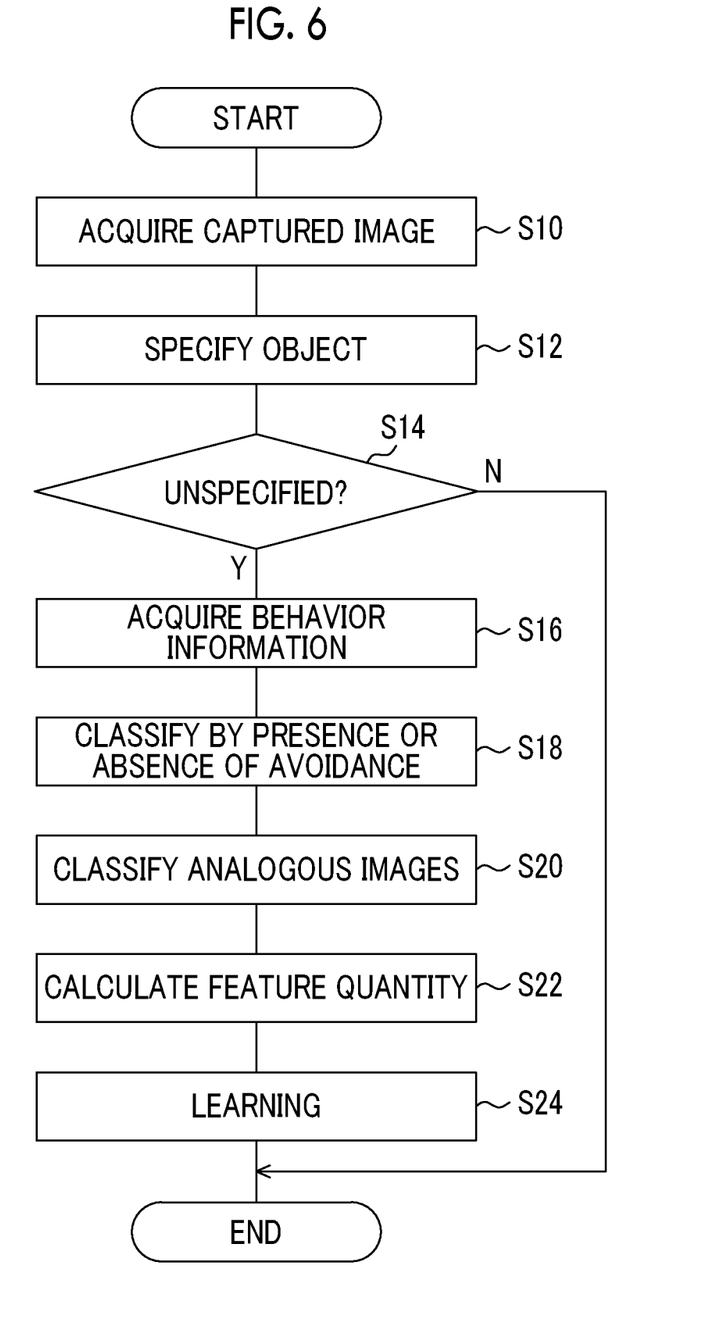
FIG. 6 is a flowchart illustrating processing for classifying image data of an unspecifiable object.

FIG. 6 is a flowchart illustrating processing for classifying image data of an unspecifiable object. The image acquisition unit 21 acquires the captured image 40 of the vehicle outside (S10). The specification unit 22 specifies an object included in the captured image 40 referring to the dictionary data (S12).

In a case where the specification unit 22 can specify an object (in S14, N), a specification result is transmitted to the in-vehicle terminal 12, and the present processing ends. In a case where the specification unit 22 cannot specify an object and cannot determine whether or not the object is needed to be avoided (in S14, Y), processing for classifying an unspecifiable object is started, and the vehicle information analysis unit 24 acquires the behavior information of the vehicle with respect to the unspecifiable object (S16), and derives whether or not the vehicle takes an avoidance operation with respect to the unspecifiable object.

The classification unit 26 classifies, based on the presence or absence of an avoidance operation of the vehicle with respect to the unspecifiable object, whether or not the vehicle needs to avoid the object (S18). The classification unit 26 classifies image data of a plurality of unspecifiable objects into analogous image groups analogous to one another (S20). The learning unit 28 calculates feature quantities from the analogous image groups of the unspecifiable objects (S22), performs learning based on the feature quantities, and creates dictionary data for enabling specification as a new type of object (S24).

The example is intended to be just illustrative, and it will be obvious to those skilled in the art that various modification examples can be made to a combination of constituent elements and that such modification examples also fall within the scope of the disclosure.

In the example, as shown in FIG. 2, although an aspect in which the image processing apparatus 10 includes the specification unit 22 and the dictionary storage unit 30 has been described, the configurations of the specification unit 22 and the dictionary storage unit 30 may be provided in the in-vehicle terminal 12. The in-vehicle terminal 12 may specify an object included in the captured image, and in a case where the object is unspecified, may transmit image data unspecified and an imaging time of the image data to the image processing apparatus 10. In the modification example, in a case where the image processing apparatus 10 changes the dictionary data, the updated dictionary data is transmitted to the in-vehicle terminal 12.

What is claimed is:

1. An image processing system comprising:
   an image acquisition unit configured to acquire a captured image obtained by imaging a vehicle outside;
   a dictionary storage memory configured to store dictionary data to be referred to in specifying an object included in the captured image;
   a specification unit configured to specify the object based on the dictionary data, the specification unit determining the object to be an unspecifiable object when the object cannot be specified based on the dictionary data;
   a behavior information acquisition unit configured to acquire behavior information indicating a behavior state of the vehicle; and
   a classification unit configured to, based on the behavior information of the vehicle with respect to the unspecifiable object, classify whether or not the vehicle needs to avoid the unspecifiable object based on whether the vehicle shows a behavior for (i) avoiding the unspecifiable object or (ii) passing through the unspecifiable object without avoiding the unspecifiable object,
   wherein image data of the unspecifiable object along with a classification result of the classification unit are used for creating the dictionary data for the unspecifiable object.

2. The image processing system according to claim 1, wherein the classification unit is configured to classify the image data of the unspecifiable object into either a first image group as a group of image data including objects that the vehicle needs to avoid, or a second image group as a group of image data including objects that the vehicle does not need to avoid.

3. The image processing system according to claim 2, wherein:
   the classification unit is configured to classify images of objects included in the image data classified into the first image group into a plurality of first analogous image groups analogous to one another and classify images of objects included in the image data classified into the second image group into a plurality of second analogous image groups analogous to one another; and
   in the dictionary data, data for specifying a new object generated for each of the first analogous image group and the second analogous image group is added.

4. The image processing system according to claim 1, wherein:
   the image acquisition unit is configured to acquire the captured images from a plurality of vehicles;
   the behavior information acquisition unit is configured to acquire the behavior information from the vehicles; and
   the classification unit is configured to classify whether or not the vehicle needs to avoid the unspecifiable object according to an avoidance proportion of the vehicles derived based on the behavior information of the vehicles with respect to the unspecifiable object.

5. The image processing system according to claim 1, further comprising a learning unit configured to create new dictionary data based on the classification result of the classification unit.

6. An image processing method comprising:
   acquiring a captured image of a vehicle outside;
   storing dictionary data to be referred to in specifying an object included in the captured image;
   specifying the object based on the dictionary data, the object being determined to be an unspecifiable object when the object cannot be specified based on the dictionary data;
   acquiring behavior information indicating a behavior state of the vehicle;
   based on the behavior information of the vehicle with respect to the unspecifiable object, classifying whether or not the vehicle needs to avoid the unspecifiable object based on whether the vehicle shows a behavior for (i) avoiding the unspecifiable object or (ii) passing through the unspecifiable object without avoiding the unspecifiable object; and
   creating dictionary data for the unspecifiable object based on image data of the unspecifiable object and a result of the classifying.

7. An image processing apparatus comprising:
   an image acquisition unit configured to acquire a captured image obtained by imaging a vehicle outside;
   a dictionary storage memory configured to store dictionary data to be referred to in specifying an object included in the captured image; and
   an information processing apparatus configured to
      acquire behavior information indicating a behavior state of the vehicle,
      specify the object based on the captured image and the dictionary data, the object being determined to be an unspecifiable object when the object cannot be specified based on the dictionary data,
      classify, using the behavior information, whether or not the vehicle needs to avoid the unspecifiable object based on whether the vehicle shows a behavior for (i) avoiding the unspecifiable object or (ii) passing through the unspecifiable object without avoiding the unspecifiable object, and
      create new dictionary data for the unspecifiable object based on a result of the classifying.

* * * * *